Aug. 25, 1953     A. H. DUNLAP ET AL     2,649,890
MACHINE AND METHOD FOR PRODUCING CORNER BEADS
FOR USE IN DRY-BUILT CONSTRUCTION
Filed April 2, 1952     10 Sheets-Sheet 1

ARTHUR H. DUNLAP
FRANK S. BOLDRIN
WILLIAM C. BOLDRIN
INVENTORS.

BY

ATTORNEYS

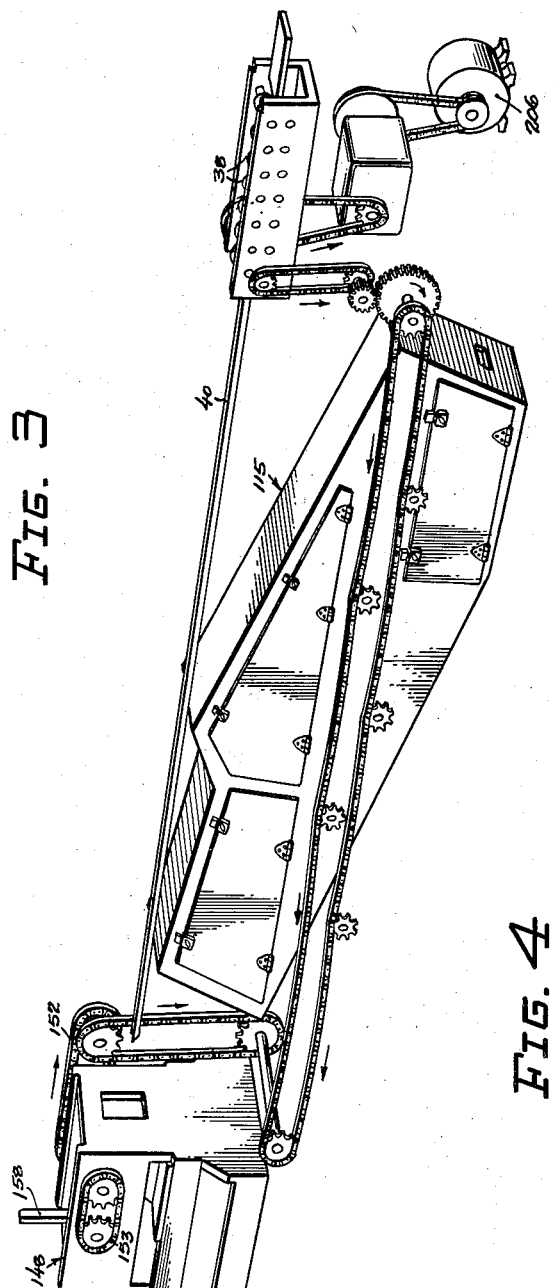

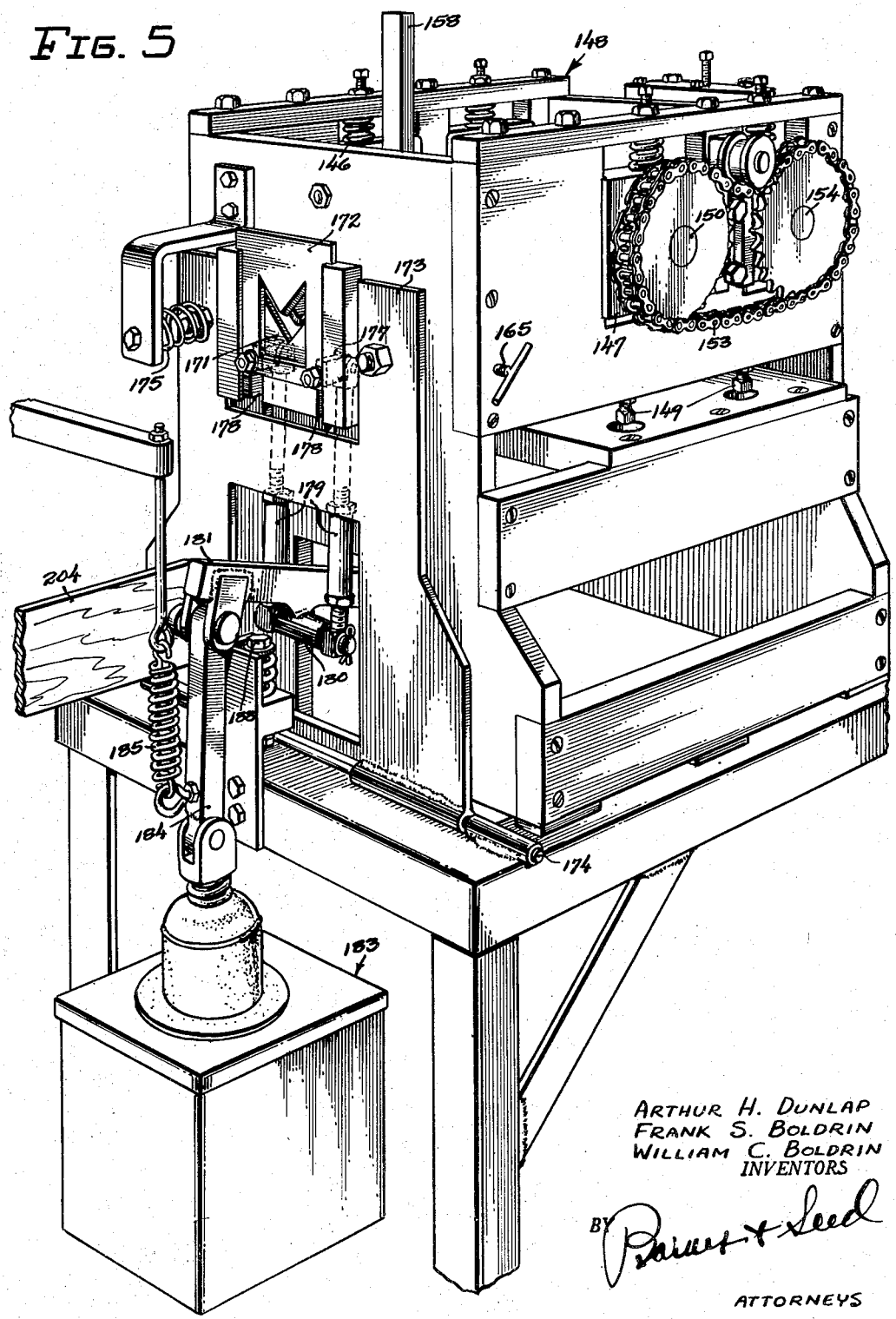

Aug. 25, 1953 — A. H. DUNLAP ET AL — 2,649,890
MACHINE AND METHOD FOR PRODUCING CORNER BEADS
FOR USE IN DRY-BUILT CONSTRUCTION
Filed April 2, 1952 — 10 Sheets-Sheet 4

ARTHUR H. DUNLAP
FRANK S. BOLDRIN
WILLIAM C. BOLDRIN
INVENTORS

ATTORNEYS

Aug. 25, 1953  A. H. DUNLAP ET AL  2,649,890
MACHINE AND METHOD FOR PRODUCING CORNER BEADS
FOR USE IN DRY-BUILT CONSTRUCTION
Filed April 2, 1952  10 Sheets-Sheet 5
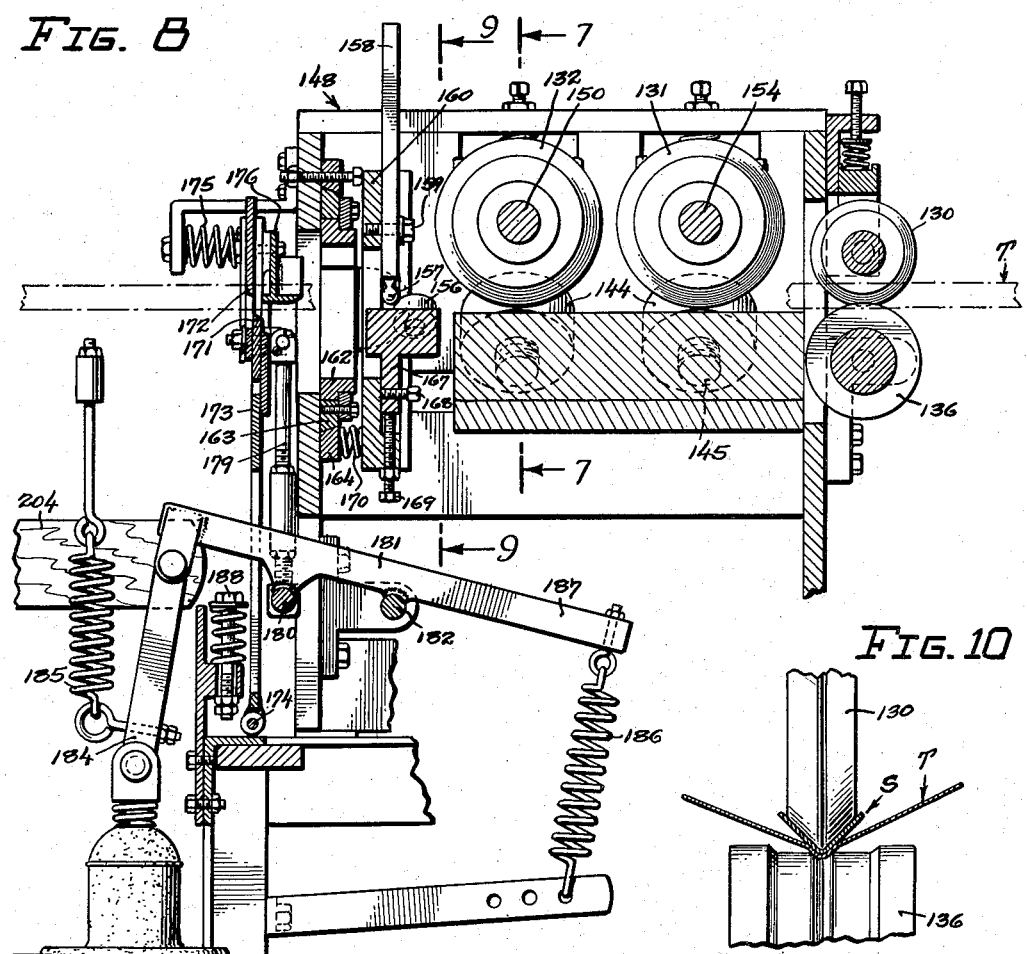
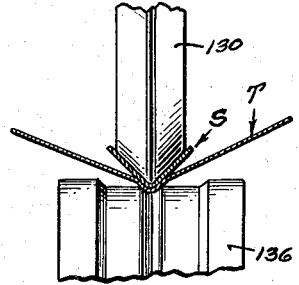
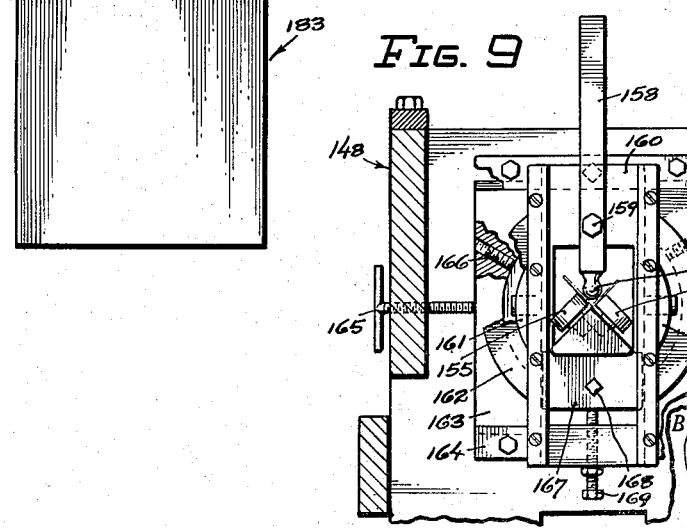
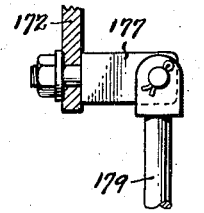
Arthur H. Dunlap
Frank S. Boldrin
William C. Boldrin
INVENTORS.
ATTORNEYS Arthur H. Dunlap
Frank S. Boldrin
William C. Boldrin.
INVENTORS

ATTORNEYS

Aug. 25, 1953    A. H. DUNLAP ET AL    2,649,890
MACHINE AND METHOD FOR PRODUCING CORNER BEADS
FOR USE IN DRY-BUILT CONSTRUCTION
Filed April 2, 1952        10 Sheets-Sheet 7
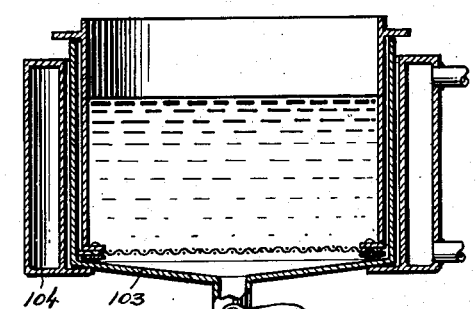
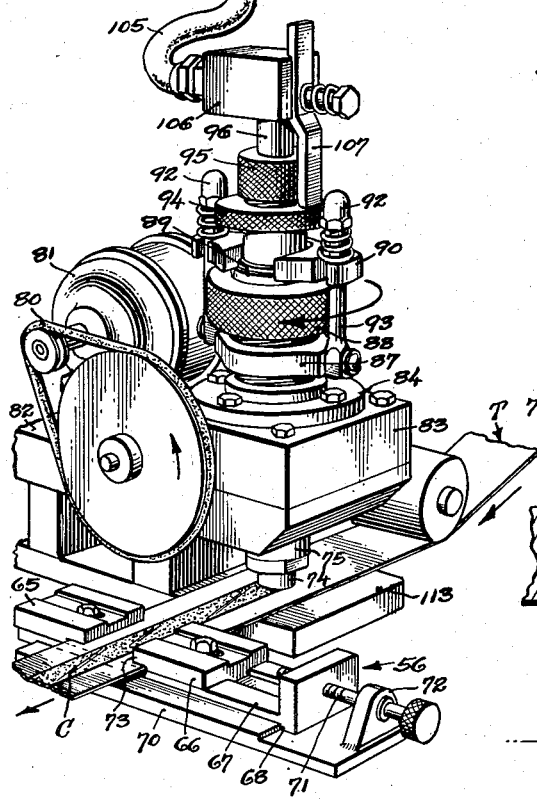
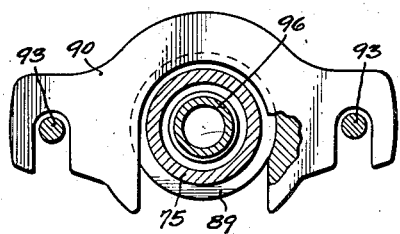
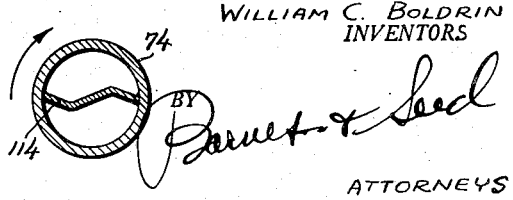
ARTHUR H. DUNLAP
FRANK S. BOLDRIN
WILLIAM C. BOLDRIN
INVENTORS
ATTORNEYS

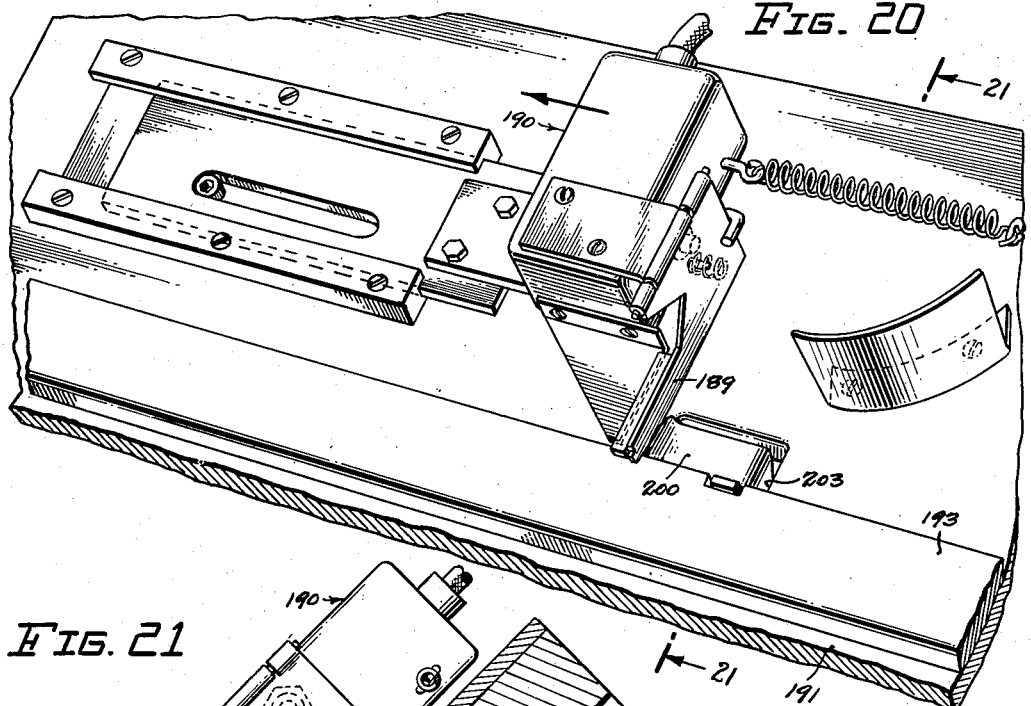
Fig. 20
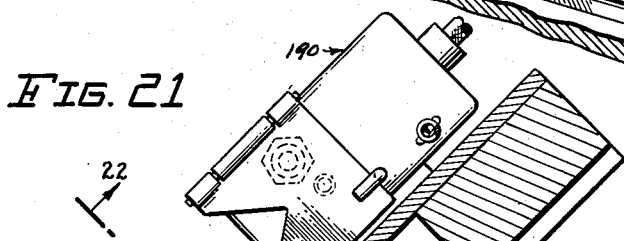
Fig. 21
Fig. 22
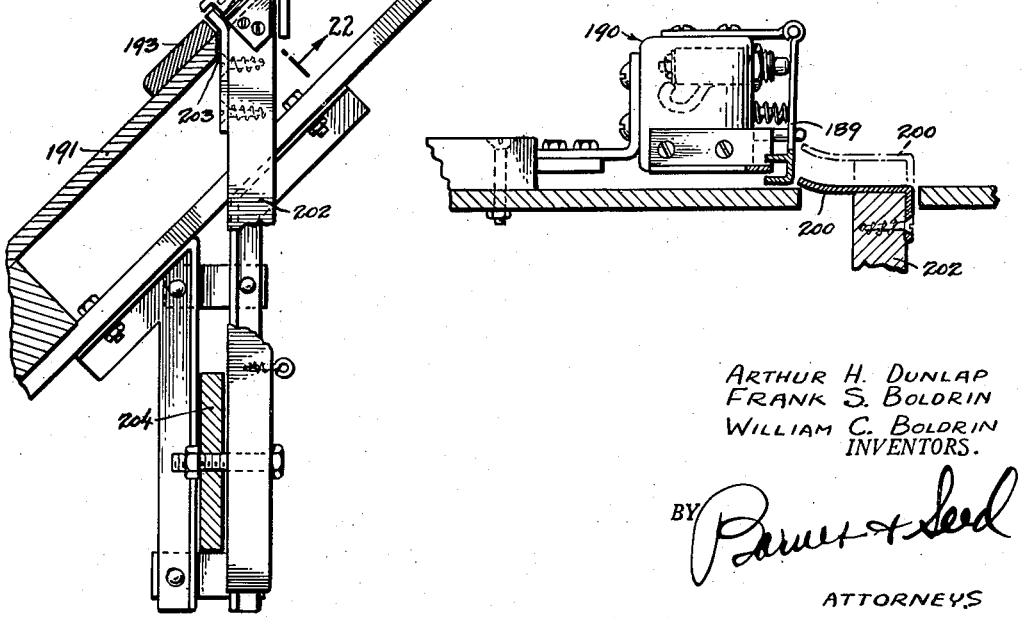
Arthur H. Dunlap
Frank S. Boldrin
William C. Boldrin
INVENTORS.
BY
ATTORNEYS

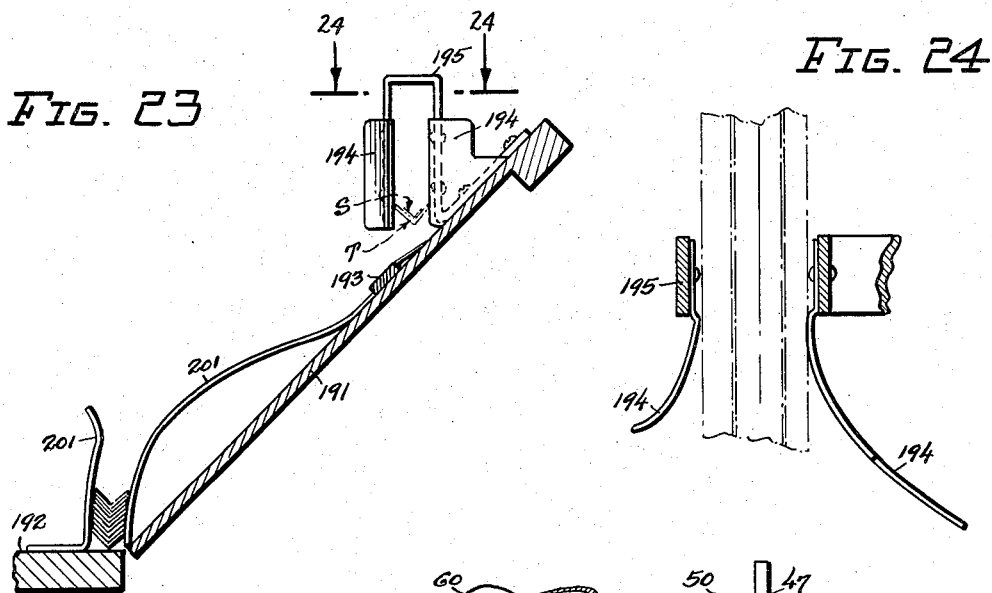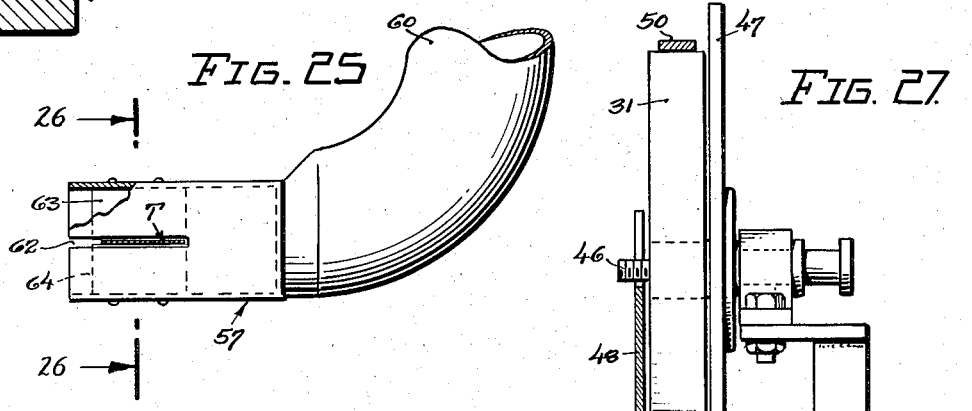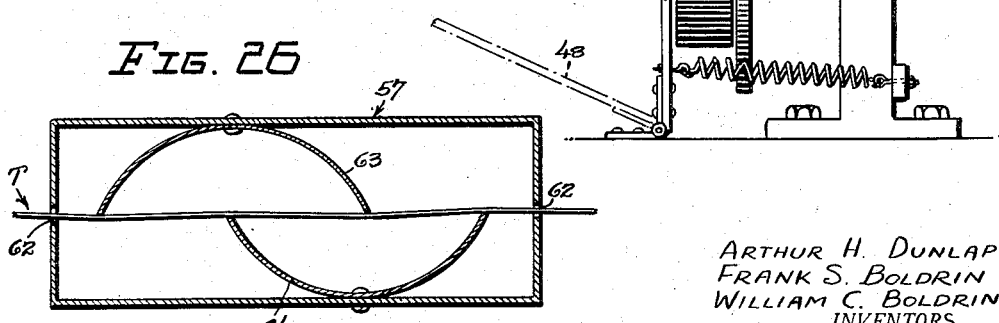

Aug. 25, 1953 A. H. DUNLAP ET AL 2,649,890
MACHINE AND METHOD FOR PRODUCING CORNER BEADS
FOR USE IN DRY-BUILT CONSTRUCTION
Filed April 2, 1952 10 Sheets-Sheet 10
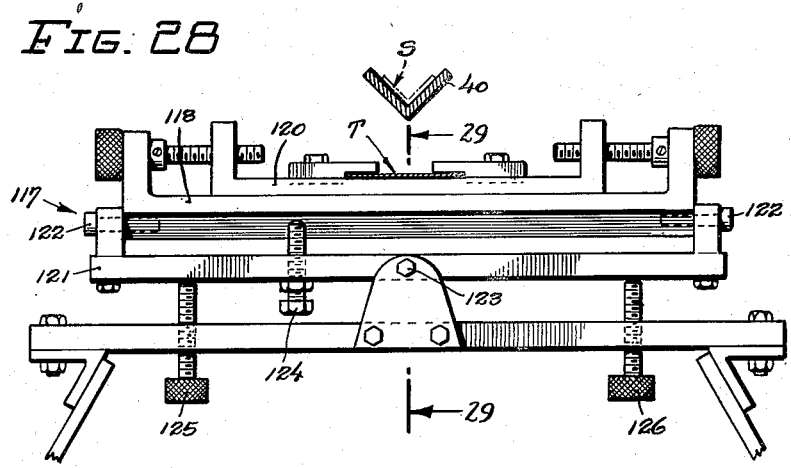
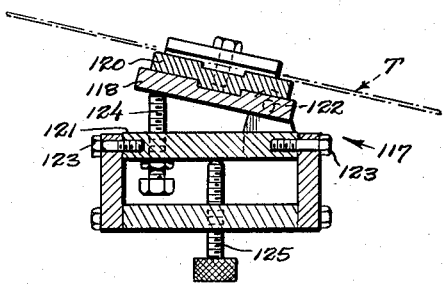
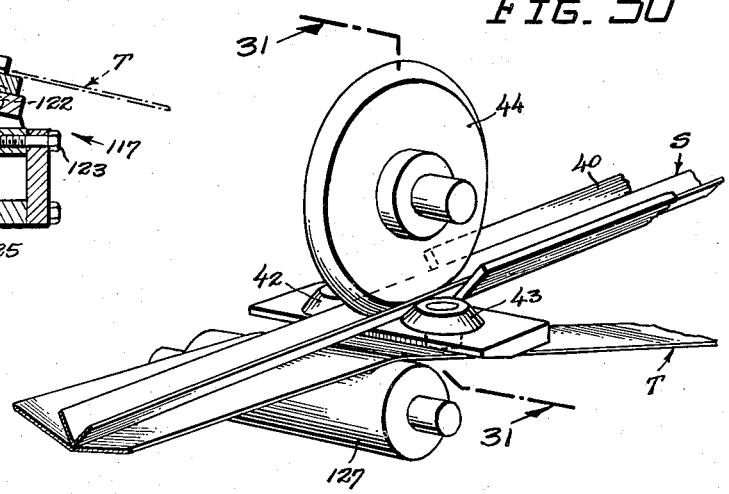
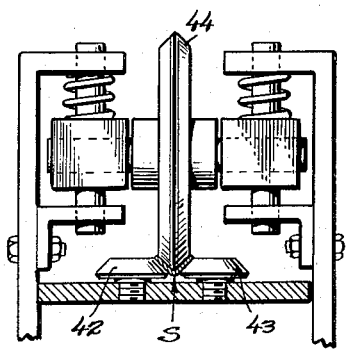
ARTHUR H. DUNLAP
FRANK S. BOLDRIN
WILLIAM C. BOLDRIN
INVENTORS
BY Barnes & Seed
ATTORNEYS Patented Aug. 25, 1953

2,649,890

UNITED STATES PATENT OFFICE 2,649,890

MACHINE AND METHOD FOR PRODUCING CORNER BEADS FOR USE IN DRY-BUILT CONSTRUCTION

Arthur H. Dunlap, Frank S. Boldrin, and William C. Boldrin, Seattle, Wash.; said Frank S. Boldrin and said William C. Boldrin assignors to said Dunlap Application April 2, 1952, Serial No. 280,142

21 Claims. (Cl. 154—1.8)

This invention relates to a machine and method for producing a corner-bead like or similar to the Fig. 1 embodiment shown and described in United States Patent No. 2,593,859, issued April 22, 1952, and namely a corner-bead composed of a metal core-strip formed to a V-shape in section and having a wider backing of flexible tape so cemented thereto that the side sections of the tape project laterally as flexible wings beyond the side edges of the core-strip. The metal from which the core-strip is made is preferably aluminum although either black or galvanized steel is also suitable, and the stock which we prefer to use is ¾" in width and .015 or .020 gauge. The flexible tape is desirably 2" in width and we find that a fairly heavy weight of kraft paper is the most advantageous material to employ although a cloth or plastic tape might feasibly be used. The corner-bead finds particular usefulness in constructing "dry-built" homes, and namely that type of construction in which plaster board is used for the inside walls. The office of the corner-bead is to provide a cap covering the corner produced by two abutting angularly placed sheets of such plaster board. After placing the bead so that the core-strip overlies the corner the same is anchored in place by trowelling a layer of Swedish putty or other like substance over the same, the layer of putty being of minor thickness and extending outwardly beyond the side edges of the flexible wings whereat it is tapered to a feather edge. The putty, which sets very rapidly, is sanded smooth. Painting the wall as a finish treatment provides a smooth corner giving a pleasing appearance comparable to that which is obtained where the inside of the house is plastered. The patent application hereinbefore mentioned shows a corner-bead in which the flexible tape is cemented to the inside face of the V-shaped metal core-strip. We find that the corner-bead better performs its intended function by having the tape cemented to the outside face and we have therefore engineered the present machine so as to apply the tape in this manner.

The present invention, for its general object, aims to provide a machine and method by which stock material for the two components of the corner-bead, and namely the core-strip and the paper tape, are continuously drawn from respective supply reels and in course of uninterrupted movement along predetermined travel paths subjected to a succession of treatments the sum effect of which is to produce and cut to usable length an extremely large quantity of corner-beads in an unusually short period of time with each of the produced beads being uniformly perfect in point of construction.

With this general object and other more particular objects and advantages in view and which will appear and be understood in the course of the following description and claims the invention consists in the novel method of producing a succession of cut-to-length corner-beads, and in the construction, adaptation and combination of the parts of the machine for practicing said method, hereinafter described and claimed.

In the accompanying drawings:

Figures 1 and 2 are fragmentary side elevational views which, taken together, illustrate a complete machine constructed to embody the preferred teachings of the present invention, the first said view, more especially, portraying that portion of the machine which takes the stock materials and forms the core-strip material to shape while simultaneously processing the tape material to put the same in a condition suitable for bonding the tape to the shaped core-strip, and the latter said view portraying a following portion of the machine which performs the bonding operation and then cuts the produced corner-bead to length.

Fig. 3 is a fragmentary perspective view of the machine. The view is schematic and deletes many of the contained parts in order to simplify the illustration.

Fig. 4 is a fragmentary elevational view taken from the back side of the machine and confined to an illustration of parts concerned with cutting the travelling corner-bead to length.

Fig. 5 is a perspective view drawn to an enlarged scale to detail the cutting mechanism proper.

Figure 6:
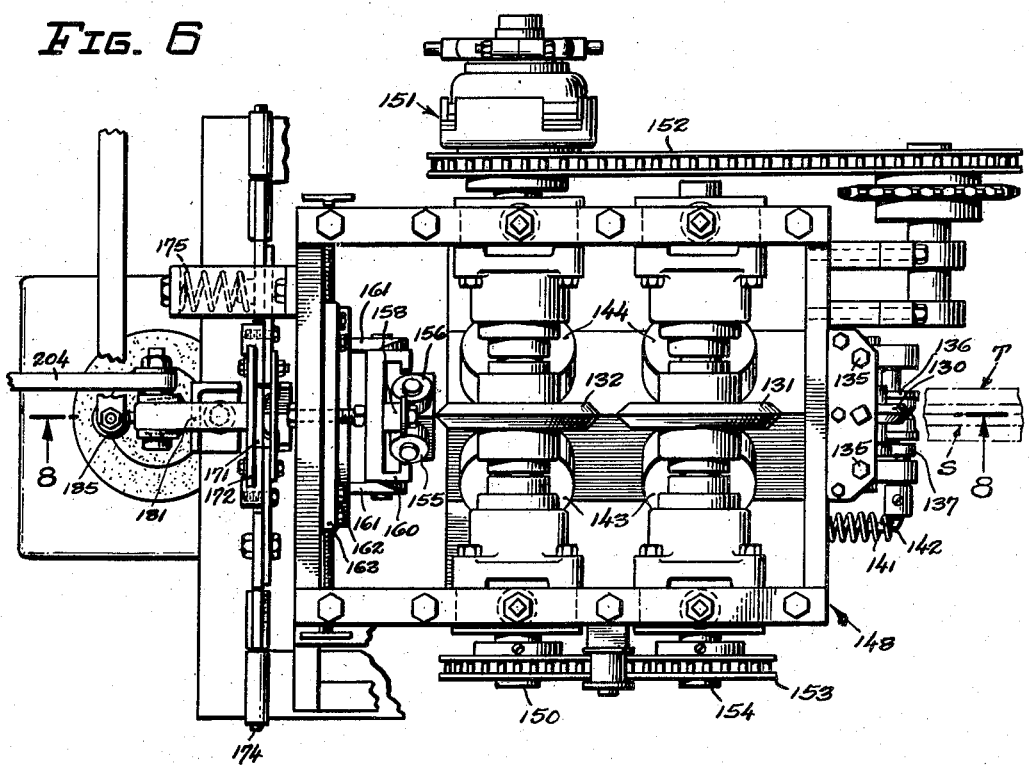
Fig. 6 is a fragmentary top plan view employing much the same scale as that of Fig. 5 and including a showing of the cutting mechanism together with previously acting mechanism which performs the operation of bonding the tape to the core-strip.
Figure 7:
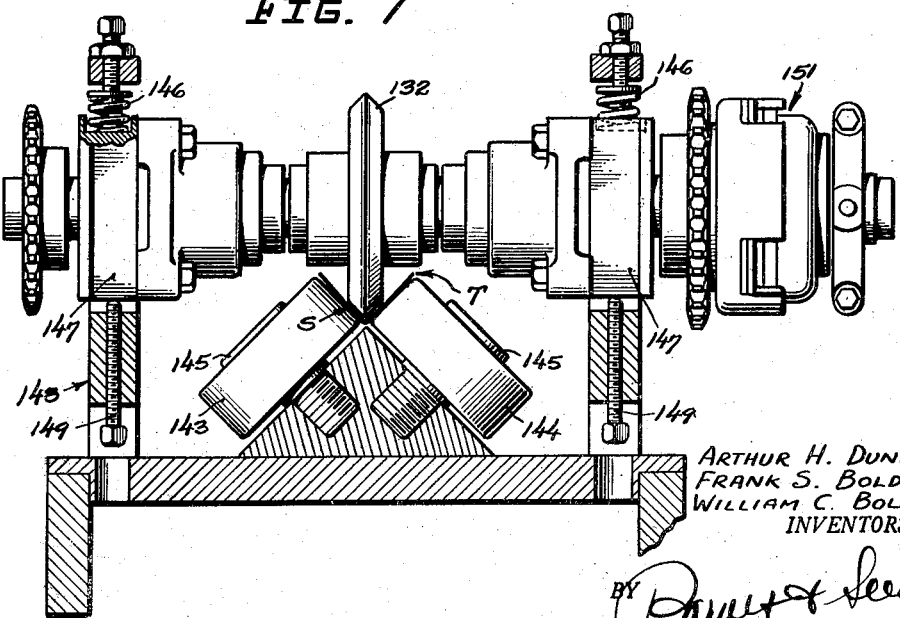

Figs. 7, 8 and 9 are respectively a fragmentary transverse vertical section, a fragmentary longitudinal vertical section, and a fragmentary transverse vertical section drawn on lines 7—7 of Fig. 8, 8—8 of Fig. 6, and 9—9 of Fig. 8.

Fig. 10 is a fragmentary transverse vertical section employing a scale larger than that of Fig. 8 and detailing the set of rollers shown at the extreme right end of such view.

Fig. 11 is a fragmentary enlarged longitudinal vertical section to better bring out, over the showing of Figs. 5 and 8, the manner in which connecting rods for reciprocally moving the cut-off knife are connected to the knife.

Figure 12:
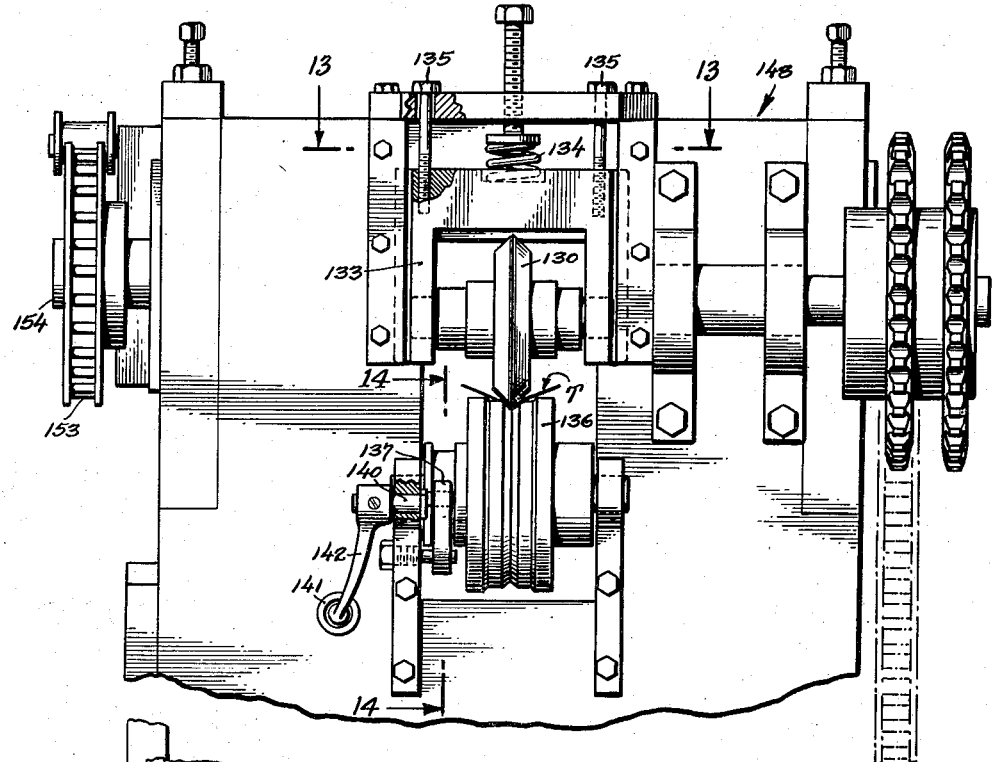

Fig. 12 is a fragmentary elevational view looking toward the lead-in or right-hand end of that portion of the machine which is portrayed in Figs. 5, 6 and 8.

Figure 13:
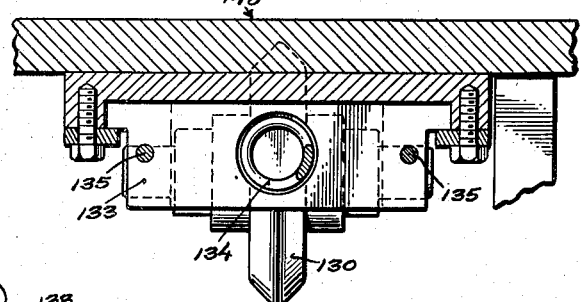

Fig. 13 is a fragmentary horizontal section drawn to an enlarged scale on line 13—13 of Fig. 12.

Figure 14:
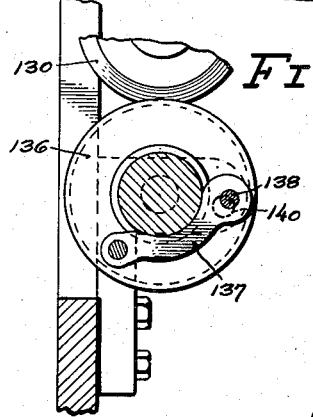

Fig. 14 is a fragmentary longitudinal vertical section drawn to an enlarged scale on line 14—14 of Fig. 12.

Figure 15:
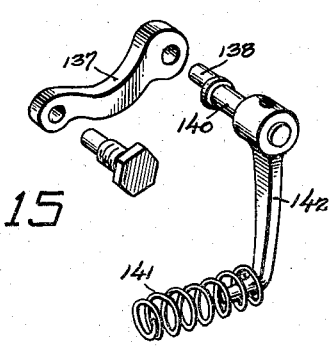

Fig. 15 is an exploded perspective view of the assembly of braking parts including the brake shoe detailed in Fig. 14.

Figure 1:
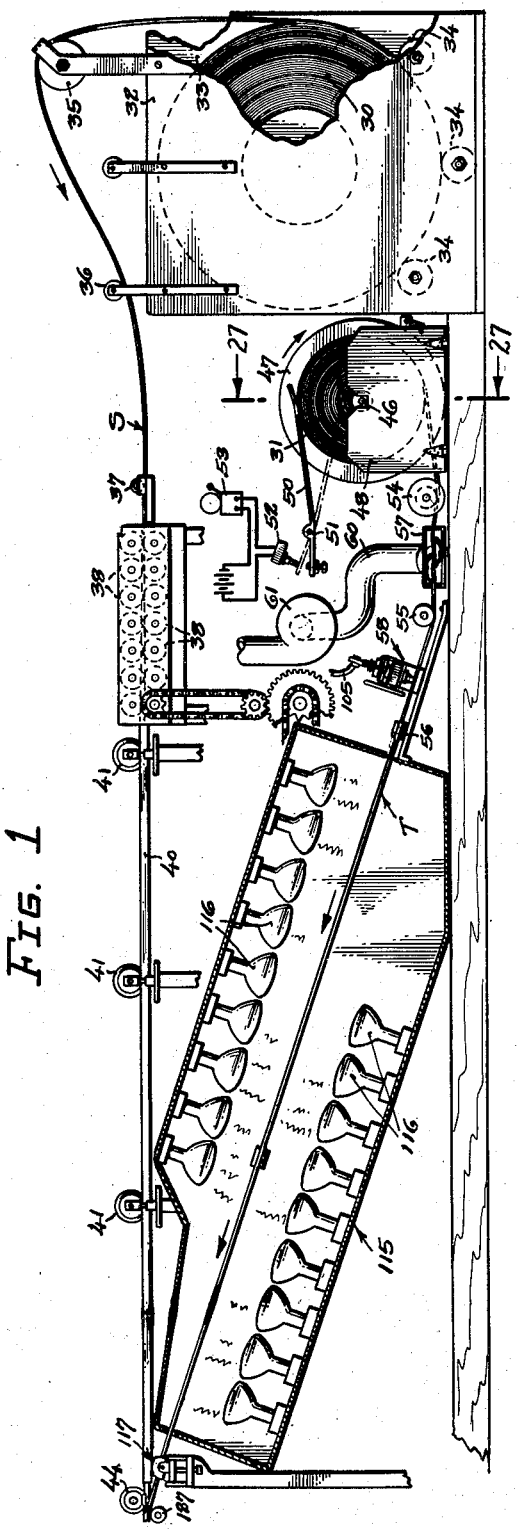

Fig. 16 is a fragmentary perspective view detailing the cement spreader which is shown more or less schematically in Fig. 1.

Fig. 17 is a fragmentary transverse vertical sectional view of said cement spreader.

Fig. 18 is a detail horizontal section on line 18—18 of Fig. 17.

Fig. 19 is a detail horizontal section on line 19—19 of Fig. 17.

Fig. 20 is a fragmentary enlarged perspective view detailing the cut-off control mechanism. As will be seen from an inspection of Fig. 2 this mechanism lies at the tail extremity of the machine.

Fig. 21 is a fragmentary transverse vertical sectional view on line 21—21 of Fig. 20.

Figure 2:
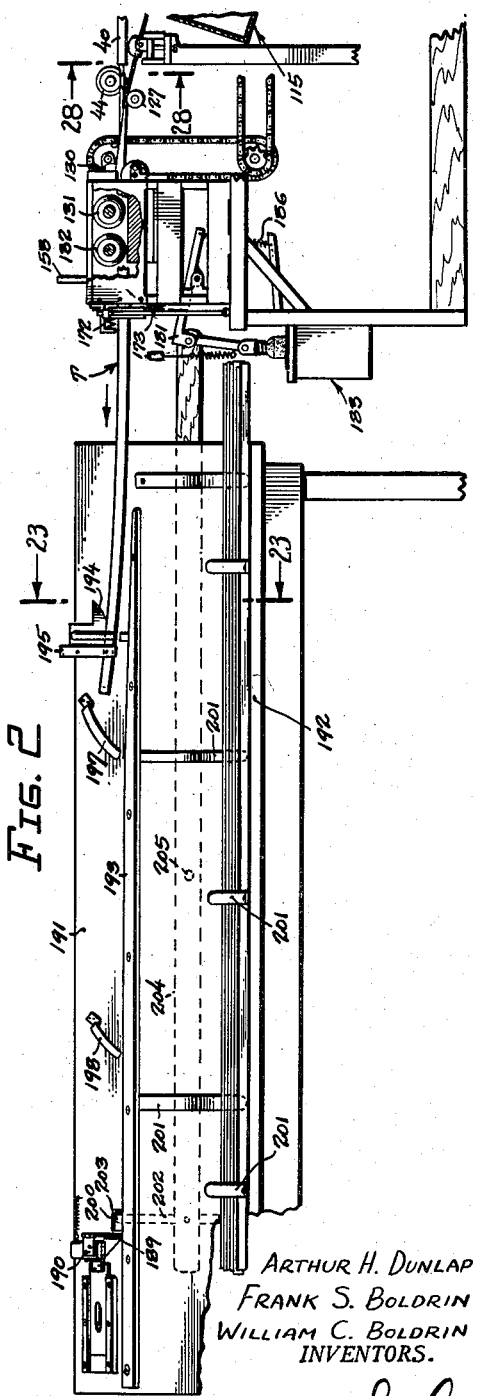

Fig. 22 is a fragmentary longitudinal vertical section on lines 22—22 of Fig. 2.

Fig. 23 is a fragmentary transverse vertical section drawn to an enlarged scale on line 23—23 of Fig. 2.

Fig. 24 is a fragmentary horizontal sectional view drawn to an enlarged scale on line 24—24 of Fig. 23.

Fig. 25 is a fragmentary end elevational view of the tape-cleaning device which, as can be seen from an inspection of Fig. 1, is supported at the head end of the machine to occupy an intervening position between the cement spreader and the reel from which the tape stock is drawn.

Fig. 26 is a longitudinal vertical section drawn to an enlarged scale on line 26—26 of Fig. 25.

Fig. 27 is a transverse vertical sectional view of the tape reel, the view being drawn to an enlarged scale on line 27—27 of Fig. 1.

Fig. 28 is an enlarged-scale fragmentary transverse vertical sectional view detailing the tape-guiding structure shown at the extreme left-hand side of Fig. 1.

Fig. 29 is a longitudinal vertical sectional detail on line 29—29 of Fig. 28.

Fig. 30 is a somewhat schematic perspective view portraying guide structure, also shown at the extreme left-hand side of Fig. 1, which operates at the point of mergence of the tape with the metal strip; and Fig. 31 is a transverse vertical sectional view drawn on line 31—31 of Fig. 30.

The steps practiced in producing the corner bead will be here cursorily traced in the belief that such will add to clarity in an understanding of the later detailed description of the machine and method.

Drawn from a respective reel of the stock material the metal strip and the paper tape each are given continuous travel along guided paths and in the course of such travel the paper tape T is first subjected to a cleaning treatment to rid the same of surface lint present thereon, following which a coating of cement is applied upon one of the two facing surfaces with the coating covering only a central portion of the tape corresponding in width to the width of the core-strip. The coated tape thereupon passes through a drying oven which operates to set the cement and the tape then is brought against the core-strip S which, moving in the meantime along a separate travel path, has been deformed from the normal flat shape of the stock material and given a V-shape in transverse section. After the paths merge so as to enable such cemented tape and said deformed core-strip to be brought together, pressure is applied to effectuate a bonding and the final step in the process is to cut the corner-bead to length, the cut lengths dropping onto a receiving platform. In performing the bonding step the procedure is one of preliminarily pressing only the longitudinal median portion of the tape against the crowning ridge or arris of the V-shaped core-strip and then working progressively toward the side edges of the metal so that the tape is substantially "wiped" over the two flanges of the strip. We employ opposing power-driven rolls for applying this bonding pressure. Such rolls, together with other power-driven rolls which perform the deformation of the core-strip, act in concert to give the core-strip the energy responsible for its travel. The frictional pull transferred from the travelling core-strip to the tape gives the latter the energy responsible for drawing the tape off its related reel and feeding the same through the cleaning, cementing, and drying stages of the tape's travel.

The two reels, one for the flat metal stock and the other for the paper stock, are designated by the numerals 30 and 31, respectively. Reel 30 occupies a position at the extreme rear end of the machine and is confined by cheek-plates 32 and 33 with the reel resting upon a set of rollers 34. The stock drawn therefrom passes up and over a guide roller 35 and thence is led forwardly by guide rollers 36 and 37 to a succession of forming rolls 38. Arranged in opposing pairs of upper and lower rolls, these forming rolls are each power-driven and operate in a well known manner to progressively deform the strip so that, upon leaving the rolls, the strip is sectionally of a V-shape having its two flanges positioned substantially at right angles to one another and with the ridge at the bottom. It may here be pointed out, where the metal used is aluminum, and which carries a greasy film as it comes off the reel, the travelling strip is desirably de-greased by passing the same through an acid bath before reaching the forming rolls.

Emerging from the forming rolls the core-strip is given support from a substantially straight V-shaped trough 40 and in its travel along this trough is pressed lightly against the floor thereof by a succession of free-turning rollers 41 each of which is moderately tensioned by springs, the rollers here employed being bevelled to a shape closely fitting the reentrant angle formed between the two flanges of the core-strip. This trough extends for a fairly appreciable distance beyond the forming rolls, and having traversed the trough the core-strip is fed through a localizing guide (Fig. 30) whereat the two flanges are firmly pressed against cone-shaped bed-rollers 42 and 43 by the pressure of a spring-loaded bevelled head roller 44, this head roller and the complementing bed-rollers being each free-turning. Following this described portion of the core-strip's travel, and which is to say momentarily after leaving the last-mentioned set of rollers, the tape T, having in the meantime progressed along a separate and lower travel path, is led upwardly toward the core-strip and after being first exactly centered with respect thereto is brought against the underside of the core-strip.

Reverting now to a description of the treatment given to the tape as it progresses along said separate and lower path of travel before reaching the core-strip, it will be seen from an inspection of Fig. 1 that the reel 31 for the tape lies immediately to the front of the reel 30. Distinguished from the reel 30, an arbor 46 carries the reel 31 and is journaled for free-turning movement about a fixed transverse horizontal axis. The arbor extends as an axial prolongation from an annular head 47, and acting with the head to hold the reel upon the arbor is a plate 48 hingedly mounted so as to permit a fresh reel to be quickly applied by slipping the same axially onto the arbor when the supply of paper tape on a previous reel has been exhausted. In order that warning may be given when the supply of tape nears depletion there is provided a signal device comprised of a lever 50 fulcrumed, as at 51, intermediate its ends and having a toe extremity of one of the two lever arms riding upon the periphery of the reel while the other lever arm acts through an adjustable screw to activate a "Micro" switch 52 as the toe drops to a position closely approaching the spool on which the tape is wound. Closing of the switch completes a normally-open electric circuit including a warning bell 53. This advance warning is important in that cement, delivered from a hereinafter described cement spreader onto the tape as the latter is guidably advanced, would in the absence of the tape have an uninhibited flow and produce an extremely messy condition which would, perforce, require that the machine be shut down for the interval of time necessary to clean the same.

To the front of the tape reel 31 are three longitudinally spaced guides 54, 55 and 56 whose office is to first lead the tape through a cleaning box 57 and then conduct the cleaned tape below a cement spreader 58. The cleaning box, which has its interior connected by a hose 60 with the suction side of a blower 61, is provided in the front and rear walls with slots 62 (Figs. 25 and 26) through which the paper is fed into and from the box, and within the box and secured centrally of their length to the top and bottom walls thereof are two bowed spring-metal leaves 63 and 64 so mounted above and below the advancing tape that the free edges of one leaf scrape the top surface and the free edges of the other leaf scrape the bottom surface of the tape, the surface lint removed thereby being perforce drawn from the box by the vacuum influence of the associated blower. The scraper leaves are longitudinally offset and the free edges project very slightly beyond a plane projected through the slots 62 so as to deflect the tape and assure an effective scraping pressure. The guides 54 and 55, which lie one to the rear and the other to the front of the cleaning box, are or may be free-turning rollers.

The other mentioned guide 56, which acts conjointly with guide 55 to properly position the tape for the application of the cement, occupies a position to the front of the cement spreader and is comprised of two blocks 65 and 66 (see Fig. 16) secured in transversely spaced relation upon a bed-piece 67 received for transverse adjustment in the slide-way 68 of a foundation plate 70, the adjustment being obtained by opposing horizontal screws 71 working in lugs 72 surmounting the two ends of the foundation plate. The travelling tape rides upon the bed-piece in the space between the blocks and each such block has a hooking lip, as 73, overhanging a related side edge of the tape to confine the tape in the latter's guide travel. The span between these lips somewhat exceeds the width of the cement coating which the spreader 58 applied to the surface of the tape momentarily before reaching said guide 56.

The salient characteristic of the spreader is that the cement is delivered through a tubular nozzle 74 revolubly driven about a vertical axis disposed normal to the travel path of the tape. The nozzle is removably fitted to the lower end of a hollow vertical spindle 75 received in and keyed for unitary rotation to a driving sleeve 76, and bolted to a flange 77 formed upon this sleeve is a worm wheel 78. In mesh with the wormwheel is a worm-gear 79, and driving such wormgear through a speed-reduction belt 80 is an electric motor 81. The electric motor rests upon a rigidly supported bed 82, and this bed additionally acts with a shell 83 and a top plate 84 to provide a case housing the worm and the wormwheel gears. The sleeve 76, which projects top and bottom through end openings in the case, is held against endwise movement by thrust bushings 85 and 86. A collar 87 and a knurled nut 88 are threaded upon the exposed upper end of the sleeve, and formed upon the hollow spindle so as to sustain the spindle by bearing upon said nut is a flange 89. Shouldering from above the flange is a yoke 90. Springs 91 subject the yoke to depressive pressure and receive a purchase from nuts 92 threaded upon the upper free ends of two arms 93 which are located at diametrically opposite sides of the yoke and are pivoted by their lower ends to the collar 87. Fitted on the upper end of the spindle are the nut and follower complements 94 and 95 of a packing gland, and received for endwise sliding movement through this gland is the stem 96 of a cylindrical body providing at its lower end a reduced axial prolongation 97 serving as a piston valve. A cylinder 98 in which this piston valve works connects directly by its lower end with the nozzle and has its upper end necked down so that the outside diameter of this neck will be less than the inside diameter of the spindle. The stem portion of said body is hollow and cement is fed from a source of supply into the upper open end of this stem from whence it escapes through ports 101 into the interior of the hollow spindle, thence working through ports 102 into the interior of the cylinder 98 for discharge through the nozzle, such ports 102 being closed at will by dropping the piston valve to the low limit of its permitted endwise travel. The source from which the cement is drawn is an overhead reservoir 103, surrounded by a hot-water jacket 104, and connecting by a hose 105 with a fitting 106 threaded upon the upper exposed end of the stem 96. A pivoted finger 107 carried by this head fitting normally occupies a vertical position whereat the lower free end foots upon the packing nut 94 and responsively raises the piston valve in the degree necessary to clear the ports 102, being swingable therefrom into an inactive horizontal position which allows the head 106 to drop by gravity. As will, it is thought, be apparent, the hollow spindle is easily and quickly removed so as to make the contained parts readily accessible for cleaning simply by freeing the yoke from its shouldering engagement against the flange 89 which frees the spindle and allows the same to be lifted free of the driving sleeve 76. Key 110, held in place by a cap screw 111, slides freely in the keyway 112.

In its travel under the nozzle the tape T is sustained by a table 113 made rigid with the bed 82, and is positioned thereon by the guide 56 so that the delivered cement is exactly centered upon the tape, the applied coating having a width substantially corresponding to or slightly wider than the metal core to which the tape is to be later bonded. The significance of using a revolving nozzle to deliver the cement onto the tape is that the cement is evenly spread and to further augment this uniformity we find it desirable to introduce in the nozzle opening a diametrically extending partitioning plate 114 shaped to the suggestion of a letter Z in horizontal section so as to induce the cement to move centrifugally as it flows toward the delivery mouth. The spreader is so disposed, vertical position considered, that the nozzle is elevated very slightly off the surface of the advancing tape, the spacing therebetween prescribing the thickness of the cement coating C applied to the tape. There is no call to vary the thickness of the coating but in the event that it might be desired to use a heavier weight of paper stock the nozzle can then be raised slightly so as to maintain the same thickness in the coating by simply applying a shim under the shouldering flange 89.

Proceeding beyond the spreader the cement-coated tape passes through a drying oven 115 wherein upper and lower banks of infra-red lamps 116 rapidly set the cement. It is upon its emergence from the oven that the path travelled by the tape merges with the path travelled by the core-strip, but momentarily before such merger the tape is again brought under the influence of a centering guide 117 (see Figs. 28 and 29) made much the same and performing much the same function as the guide 56 excepting that in this instance the foundation plate 118 which provides the slide mounting for the bed-piece 120 is adjustable for slope about a transverse horizontal swing axis, and the yoke 121 which carries the hinge pins 122 admits of being adjustably levelled about the longitudinal axis of a center fulcrum 123. The slope adjustment is accomplished by a set screw 124 while two opposingly acting screws 125 and 126 provide the levelling adjustment.

Having been exactly centered and levelled the tape establishes light contact with the core-strip S by passing over a free-running roller 127, and progressing therefrom the core-strip and the tape reach the first of three successively acting sets of upper and lower rollers which exert compressive bonding pressure thereon. The pressure here exerted increases in intensity with each succeeding set and the roller sets are so formed that the first set of rollers press the tape only against the apical or arris portion of the core-strip while the second and third sets of rollers complete the bonding by wiping the wing sections of the tape over the flanks of the core-strip. Said upper rollers, designated by 130, 131 and 132, each fit in the trough of the core-strip and are bevelled to a shape corresponding therewith. In the instance of the roller 130, trunnions extending laterally from the hub thereof are journaled in the yoke-arms of a U-shaped cross-head 133 working in vertical slide-ways, and exerting yielding pressure from above upon said cross-head is a compression spring 134. Adjustable stops 135 limit the thrust movement. The lower roller 136 which complements said roller 130 is a stepped roller providing in the center a V-groove mating with the roller 130 but of a shallow depth so as to take only the apical portion of the core-strip. The purpose in stepping this roller 136 at each of the opposite sides of the V-groove is to initiate a raising of the wing section of the tape without, however, bringing the same against the flanks of the core-strip. Each of the two rollers in this first set of pressure rollers is free-running but there is provided for the lower roller 136 a friction drag bearing upon the hub thereof and which is or may be comprised of a pivoted shoe 137 having fitted in the apertured free end thereof an eccentric 138 carried upon the end of a rock-shaft 140. Yielding pressure from a spring 141 acts through a lever arm 142 to move the eccentric so as to press the shoe against the hub. The purpose in braking said roller 136 is to preclude wrinkling of the paper tape by introducing a retarding influence working against the pull force which the travelling core-strip transmits to the tape.

As respects the second and third set of pressure rollers the same are much alike structurally and a description of the one will suffice for the other. In each such instance there are two bottom rollers, as 143 and 144, journaled on pins 145 for free-turning movement about axes at right angles to one another each sloped 45° from the horizontal, and more particularly such that the top-most surfaces of the two rollers act in concert to define a substantial V-groove produced in mating correspondence with the related top roller. The V-groove is quite deep so as to support the wings of the tape throughout the full width thereof. Compressive pressure for the top rollers 131 and 132 of said second and third roller sets is exerted by springs 146 upon sets of cross-heads 147 guided for vertical movement in slide-ways of a framing box 148. Screws 149 limit the thrust movement. Trunnions 150 which carry the roller 132 and which are journaled in the related set of cross-heads 147 are power-driven through an over-running clutch 151 from a driven chain 152. It is largely a matter of choice whether the roller 131 be free-running or power-driven but we have here shown a transfer chain 153 passing power from the trunnions 150 back to the trunnions 154 which carry the roller 131.

It is here pointed out that the tape, having been wetted by the cement, heated in consequence of its travel through the drying oven, and subjected to a certain degree of stretching as the same moves through the successive stages of applied bonding pressure, thereafter partakes of a certain amount of shrinkage as the cement cures in the atmosphere. Accordingly, unless compensation were made for this shrinkage, it would tend to permanently longitudinally bow the corner-bead. In order to obviate such bowing we cause the corner-bead to be bent upwardly in a slight degree as it issues from the third set of said pressure rollers and progresses to a point whereat the same is cut to length. While the slight bend can hardly be detected within the span of the approximate 1 ft. length of corner-bead which we show by dash-and-dot lines in Fig. 8 and would thus require considerable exaggeration if the same were to be brought out in this view, the cumulative effect makes the bend quite pronounced in a longer piece and the same can be readily seen from an inspection of Fig. 2. To provide the bending action and also to properly position the corner-bead as it is fed to a cut-off knife located somewhat to the front of said sets of pressure rollers there is provided a tail guide detailed in Figs. 8 and 9. The corner-bead here rides in the V-groove provided by two slightly elevated rollers 155 and 156 mounted in much the same manner as the rollers 143 and 144, and bearing upon the corner-bead from above is a ball-shaped foot 157 formed upon the lower end of a vertically disposed arm 158 fulcrumed upon a clamping screw 159 so as to permit the foot to be set in transversely adjusted positions. Giving support through said clamping screw to the arm 158 is a carrier 160 trunnion-mounted from the cheek projections 161 of a turn-stock 162, and supporting the turn-stock so as to permit the same to be shifted revolubly about a longitudinal axis is a mounting 163 which itself admits of being shifted transversely in slide-ways formed by gibs 164. This transverse adjustment is governed by two backing screws 165, and for fixing the turn-stock in rotatively adjusted position there are provided set-screws 166. A block 167 from which the two bottom rollers of this described tail-guide derive their support is fitted for vertical adjustment in a slide-way provided by said carrier 160, and for setting the block two screws 168 and 169 are provided. The trunnion mounting for the carrier permits the carrier to rock slightly against the yielding force imposed by a spring 170, and the purpose thereof is to cushion the tail guide against shock transferred thereto through the corner-bead as the latter is cut to length by the action of opposing and relatively movable cut-off knives located immediately to the front of said tail-guide. The carrier 160 as well as the turn-stock 162 and the mounting 163 are each centrally apertured for the free passage of the corner-bead therethrough.

Proceeding now to a description of the opposing cut-off knives 171 and 172, the most salient characteristic thereof is that the same move forwardly in concert with the corner-bead as the knives perform their cutting action. This we accomplish by mounting the knives upon the upper free end of a plate 173 having its lower end hinged, as at 174, for fore-and-aft swinging movement about a transverse horizontal axis, and resisting the forward swing motion so as normally to position the plate at the aft limit of swing movement is a spring 175. The two knives lie one above and one below the travel path which a V-shaped overhead member 176 prescribes for the corner-bead, and the lower said knife 171 is fixed to the plate 173 while the upper knife 172, which is arranged for shearing motion relative to the lower knife, moves in vertical slide-ways along the front face of the plate. Two bars 177 which are fastened to the lower end of the movable knife at the opposite sides thereof, and which are accommodated in vertical slots 178 (Fig. 5) provided in the plate, extend from the knife at the front to connecting rods 179 at the rear, and attached by a cross-arm 180 to the lower ends of these connecting rods is a lever 181 of the third order fulcrumed, as at 182, for pivotal movement about a transverse horizontal axis. A solenoid 183 is connected by a link 184 to the free end of this lever so as, upon being energized, to draw the arm downwardly and responsively operate the movable knife in its shearing action. Working counter to this solenoid-operated movement are two-coacting springs 185 and 186, one being attached to the link and the other to an arm prolongation 187 of the lever. Underlying the lever is a spring-loaded bumper 188.

In order that the shearing knives may perform their intended function of cutting the corner-bead to length, the leading end of the bead travels a predetermined distance beyond the knives and there contacts a trigger 189 (Figs. 20, 21 and 22) which activates a "Micro" switch 190 and closes a normally-open electric circuit including the solenoid. The trigger and switch are mounted upon a slide-board 191 which slopes upwardly from a receiving platform 192, and secured upon the face of the board to produce a ledge sustaining the corner-bead as it moves toward the trigger is an elongated cleat 193. As before stated, the corner-bead has been bowed upwardly by the lift force imposed thereon by the rollers 155 and 156 of the tail-guide and in progressing beyond the knives the upwardly bowed end is first fed by flared lead-in shoes 194 through the throat of a U-shaped guide 195 and is then deflected downwardly onto the ledge 193 by a pair of successively acting spring fingers 197 and 198 which are caused to track in the trough of the corner-bead. As the corner-bead strikes the trigger and closes an electric circuit through the solenoid, responsively activating the knives in the performance of their shearing function, a vertically movable kick-shoe 200 acts simultaneously to push the leading end of the corner-bead off the ledge and the cut length of corner-bead then slides down the face of the slide-board onto the receiving platform, being fed thereto so as to establish a nesting of successively cut lengths by guide arms 201 (Figs. 2 and 23). The kick-shoe surmounts a leg 202 which works through a slot 203 formed in the slide-board 191, and this leg connects by its lower end with a longitudinally extending treadle 204. The treadle has a center fulcrum 205 and connects by its rear end with the free front end of the lever 181 so as to operate the kick-shoe simultaneously with the operation of the shearing knives.

While there is diagrammed in Fig. 3 a system for driving the forming rolls 38 and the overrunning clutch 151 from an electric motor 206 common to both, this view would seem to indicate that only one of the several forming rolls is driven off said motor. An intermeshing set of driver and idler gears, deleted from the view for simplicity in illustration, pass the drive from one to another said forming roll through the entire upper and lower series of rolls.

It is thought that the invention, its operation, and advantages will have been clearly understood from the foregoing description of my illustrated preferred embodiment. It will be understood that structural changes within the scope of the teachings may be resorted to without departing from the invention and I accordingly intend that no limitations be implied and that the hereto annexed claims be read with the broadest interpretation to which the employed language fairly admits.

What we claim is:

1. In a machine for producing a corner-bead composed of a sectionally V-shaped core-strip having a wider backing of flexible tape bonded in centered relation thereto, in combination: separate supply reels of flat stock material, one for the core-strip and the other for the tape, means acting to draw the stock materials off said reels and continuously advance the same along respective guided travel paths which initially follow separate courses and thereafter merge, deforming rolls acting upon the core-strip material as it moves along its said separate course for giving the same a sectional V-shape, means acting successively upon the tape material as the latter moves along its said separate course for first removing adherent lint from a facing surface thereof, then for applying a centered coating of liquid cement upon said facing surface, and finally for partially drying the cement coating, means for exactly centering the cement-coated tape relative to the formed core-strip momentarily in advance of the point at which the two paths merge, and means acting upon the tape and the core-strip as the two move together along said merged travel paths for firmly pressing the core-strip against the cemented surface of the tape to produce the corner-bead.

2. In a machine for producing multiple lengths of a corner-bead having a sectionally V-shaped core-strip bonded in parallel relation upon a wider backing of flexible tape, in combination: separate supply reels of flat stock material, one for the core-strip and one for the tape, means for drawing the stock materials from said reels and continuously advancing the same along respective guided travel paths which initially follow separate courses and are thereafter caused to merge with the longitudinal center lines parallel, deforming rolls occupying a position along said separate course of the core-strip stock and acting upon the latter to give the same a sectional V-shape, means located along said separate course of the tape stock for applying a coating of cement to that surface of the tape which is to engage the core-strip, plural sets of opposing pressure rolls located at spaced intervals along the merged travel paths of said core-strip and tape and acting successively to press the core-strip firmly against the cemented surface of the tape, and means acting upon the produced corner-bead in the course of its continued travel beyond the pressure rolls for cutting the bead to length.

3. The combination with means for continuously advancing a core-strip of V-shaped sectional configuration along a guided travel path, means for continuously advancing a flexible tape wider than the core-strip along a guided travel path which is initially isolated from and later merges with the path travelled by the core-strip so as, when said core-strip and said tape merge, the tape overlies the ridged face of the core-strip in parallel relation thereto, means acting upon said tape while it is isolated from the core-strip for applying to the surface of the tape which is to overlie the core-strip a coating of cement, and successively acting opposed and mating pressure devices located along the merged paths of travel with one device in each of said sets having a close-fitting tracking engagement in the exposed trough of the core-strip and with the other device in each set bearing upon the exposed face of the tape.

4. The combination with means for continuously advancing a core-strip along a guided travel path, means for continuously advancing a flexible tape wider than the core-strip along a guided travel path which is initially isolated from and later merges with the path travelled by the core-strip so as, upon mergence, to cause the tape to become contiguous with the core-strip in parallel relation thereto, means acting upon said tape while it is isolated from the core-strip for applying to that surface of the tape which is to engage the core-strip a coating of liquid cement, and means located along the merged paths of travel for exerting opposing bonding pressures upon the exposed faces of the contiguous core-strip and tape.

5. Structure according to claim 4 in which the tape is of a fibrous material and in which means are provided for imposing upon the core-strip and the tape as the two travel beyond said last-named means a bending force effective to longitudinally bow the same in a direction and degree offsetting the countering bend which the tape imposes upon the core-strip in consequence of the shrinkage taking place as the cement cures.

6. The combination with means for continuously advancing a core-strip along a guided travel path, means for continuously advancing a wider web of flexible tape along a guided travel path which is initially isolated from and later merges with the path travelled by the core-strip so as, upon mergence, to have the tape contiguously overlie the core-strip in parallel relation thereto, means acting successively upon said tape while it is isolated from the core-strip for first cleaning the facing surfaces of the tape to rid the same of adherent lint and then applying to that cleaned surface of the tape which is to overlie the core-strip a coating of cement corresponding in width to the width of the core-strip, and means occupying a position along the merged travel paths of said core-strip and tape for pressing the core-strip firmly against the cement which coats the tape.

7. Structure according to claim 6 in which the means for cleaning the travelling tape comprises a box through which the tape is drawn having its interior connected to the suction side of a blower and providing, within said interior, top and bottom members performing a scraping action upon the facing surfaces of the tape.

8. Structure according to claim 2 in which the means for applying said cement comprises an annular nozzle supported by the machine to closely overlie the advancing tape and journaled for rotation about an axis perpendicular to the tape, a source of cement supply, a connection from said source of cement supply to the nozzle, and means for revolving the nozzle.

9. The method of producing the described corner-bead composed of a sectionally V-shaped core-strip having a wider web of tape bonded in centered relation thereto, and comprising the steps of continuously advancing stock materials for the two components along respective guided travel paths which initially are separated and later merge, forming the core-strip material to said V-shape as it moves along its said initial travel path and at the same time, as the tape material moves along its own initial travel path, applying to such tape material a coating of cement, and bonding the two components together by force of opposing pressures applied as the components move together along their merged paths.

10. In a machine for producing a corner-bead having a flexible tape bonded to a sectionally V-shaped core-strip, means for continuously advancing stock materials for the tape and core-strip to a common travel path, plural sets of opposing pressure rolls located at spaced intervals along the said travel path and arranged and adapted to successively press the tape and core-strips together, the last acting of those pressure rolls which press directly upon the core-strip being power-driven to give travelling energy directly to the core-strip and indirectly through the core-strip to the tape, and the first acting of those pressure rolls which press directly upon the tape being an idler roll, and means for applying a yielding braking influence upon said idler roll to prevent wrinkling of the tape.

11. The method of producing multiple lengths of corner-bead each composed of a transversely bent core-strip having a flexible tape bonded thereto throughout its length and extending transversely beyond at least one side edge thereof, said method including the steps of continuously advancing flat stock materials for the core-strip and the tape along respective guided travel paths which merge, deforming the advancing flat core-strip material to said transversely bent shape before it merges with the tape, bonding the core-strip and tape one to the other as they move along together after merging to thereby form the corner-bead, and severing individual lengths from the said formed corner-bead.

12. The method of producing multiple lengths of corner-bead each composed of a transversely bent core-strip having a flexible tape bonded thereto throughout its length, and comprising the steps of continuously advancing flat stock material for the core-strip and the tape along respective guided travel paths which merge, deforming the advancing flat core-strip material to said transversely bent shape and applying cement to said advancing tape material before they merge, bonding the core-strip and tape one to the other with the cement as they move along together after merging to thereby form the corner-bead, and severing individual lengths from the said formed corner-bead.

13. The method of producing a corner-bead composed of a core-strip with a generally V-shaped cross-section having a flexible tape bonded thereto throughout its length, and comprising the steps of continuously advancing stock materials for the core-strip and the tape along a common path, and bonding the advancing core-strip and tape one to the other with cement by initially pressing the tape against only the apical portion of the core-strip and then, as they advance further, progressively working the pressure outwardly toward the side-edge limits of the core-strip.

14. The method of producing multiple straight lengths of corner-bead each composed of a core-strip having bonded thereto by cement throughout its length a flexible fibrous tape, said method including the steps of continuously advancing stock materials for the core-strip and the tape along a path which is gently bent in a direction causing the tape to travel slightly farther than the core-strip while they are traversing said path, bonding the core-strip and tape one to the other with the cement as they move together along the said path to thereby form the corner-bead, and then severing individual lengths from the formed bead, the bend of said path being such as to give each said individual length of corner-bead a longitudinally bowed configuration at the moment of severance which will compensate for later shrinkage of the tape as the cement thereafter cures in the atmosphere to thereby obtain straight lengths of corner-bead when the cement is fully cured.

15. The method of producing multiple straight lengths of corner-bead each composed of a metal core-strip having bonded thereto by cement throughout its length a paper tape, said method including the steps of continuously advancing stock materials for the core-strip and the tape along a path which is gently bent with the tape occupying the outside of the bend so that it is caused to travel slightly farther than the core-strip while traversing the path bonding the core-strip and tape one to the other with the cement as they move together along the said path to thereby form the corner-bead, and then severing individual lengths from the formed bead, the bend of said path being such as to give each said individual length of corner-bead a longitudinally bowed configuration at the moment of severance which will compensate for later shrinkage of the tape as the cement thereafter cures to thereby obtain straight lengths of corner-bead when the cement is fully cured.

16. Structure according to claim 4 in which the means last described comprises a cut-off knife mounted for reciprocal movement from a normal inactive position into and out of a cutting position, an electrically energized source of power for operating the cut-off knife in its said cutting movement, a normally open electric circuit including said power means, and means occupying a position spaced beyond the cut-off knife in the travel path of the advancing corner-bead operable upon contact of the leading end of the corner-bead therewith for closing said circuit.

17. Structure according to claim 16 having means operable in concert with the cut-off operation of the knife for forcefully removing the cut front-end section of the advancing corner-bead to clear the travel path for the advance of a following section of the bead.

18. The method of producing multiple lengths of corner-bead each composed of a transversely bent core-strip having a flexible tape bonded thereto throughout its length, and comprising the steps of continuously advancing flat stock material for the core-strip and the tape along respective guided travel paths which merge, deforming the advancing flat core-strip material to said transversely bent shape before it merges with the tape, bonding the core-strip and the tape one to the other as they move along together after merging to thereby form the corner-bead, and severing individual lengths from the said formed corner-beads.

19. The method of claim 18 in which the core-strip is thin metal and the flexible tape is paper.

20. In a machine for producing a corner-bead composed of a core-strip and a flexible tape bonded together in parallel relation, the combination with means for advancing stock material for the core-strip and for the tape along guided travel paths which are initially separated and later merge so as, when said core-strip and said tape merge, the tape becomes contiguous with the core-strip in parallel relation thereto, means acting upon one of the two components of the corner-bead as it travels its said separate path for applying a coating of cement to the surface which is to be brought contiguous with the other said component, and means located along the merged paths of travel for exerting opposing bonding pressures upon the exposed faces of the contiguous core-strip and tape.

21. The method of producing a straight length of corner-bead composed of a core-strip having bonded thereto by cement throughout its length a flexible fibrous tape, said method including the steps of gently bending the core-strip in a direction longitudinally of its length, placing the tape in overlying contiguous relation to said bent core-strip, with a coating of the cement therebetween, and with the tape occupying the outside of the bend so as to be slightly longer than the core-strip which is overlies, and causing the tape to be bonded by said cement to the core-strip while the core-strip remains bent, the bend of said core-strip being such as to give the produced length of corner-bead a longitudinally bowed configuration which will compensate for later shrinkage of the tape as the cement thereafter cures so as to thereby obtain a straight length of corner-bead when the cement is fully cured.

ARTHUR H. DUNLAP.
FRANK S. BOLDRIN.
WILLIAM C. BOLDRIN.

References Cited in the file of this patent

UNITED STATES PATENTS

| Number | Name | Date |
| --- | --- | --- |
| 1,541,297 | Van Horn | June 9, 1925 |
| 2,146,223 | Penkala | Feb. 7, 1939 |
| 2,234,701 | Lyman | Mar. 11, 1941 |
| 2,255,123 | McGee | Sept. 9, 1941 |
| 2,291,171 | Muench | July 28, 1942 |
| 2,294,324 | Wilkens et al. | Aug. 25, 1942 |
| 2,390,612 | Ogg | Dec. 11, 1945 |
| 2,423,962 | Clark et al. | July 15, 1947 |
| 2,431,353 | Varner et al. | Nov. 25, 1947 |
| 2,436,383 | Dettman | Feb. 24, 1948 |
| 2,566,152 | Wright | Aug. 28, 1951 |
| 2,593,859 | Dunlap | Apr. 22, 1952 |